Dec. 20, 1966 J. W. DIEFFENDERFER 3,293,421

DIVIDER CIRCUIT INCLUDING PYRAMID ARRANGEMENT OF ADDERS AND SUBTRACTORS

Filed Oct. 29, 1964 3 Sheets-Sheet 1

INVENTOR

JAMES W. DIEFFENDERFER

BY Thomas & Crickenberger

ATTORNEYS

Dec. 20, 1966 J. W. DIEFFENDERFER 3,293,421

DIVIDER CIRCUIT INCLUDING PYRAMID ARRANGEMENT OF ADDERS AND SUBTRACTORS

Filed Oct. 29, 1964 3 Sheets-Sheet 3

United States Patent Office 3,293,421

Patented Dec. 20, 1966

3,293,421

DIVIDER CIRCUIT INCLUDING PYRAMID ARRANGEMENT OF ADDERS AND SUBTRACTORS

James W. Dieffenderfer, Nichols, N.Y., assignor to International Business Machines Corporation, Armonk, N.Y., a corporation of New York Filed Oct. 29, 1964, Ser. No. 407,466
11 Claims. (Cl. 235—164)

This invention relates to arithmetic devices and more particularly to such devices for performing divide operations.

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention utilizes recursion technique to perform a serial division. It may be instrumented in a digtal computer usng the two's complement method of representing negative numbers. The recursion formula may be expressed as:

(1) $Q_i = R_{i\,sign} \cdot DV_{sign} + \overline{R_{i\,sign}} \cdot \overline{DV_{sign}}$ (2) $R_{i+1} = 2R_i + (1-2Q_i)DV$ where $i = 1, 2, 3 \ldots n$.

$Q_i$ = the $i$th quotient bit.

$DV$ = the divisor.

$R_i$ = the remainder.

Since sums and differences of numbers are generated low order first in serial machines, the sign of the sum or difference is not known until the addition or subtraction is complete. From Equation 1, it is obvious that $Q_{i+2}$ cannot be determined until the sign of $R_{i+1}$ is known, and from Equation 2 it is also obvious that the sign of $R_{i+1}$ is not known until the operation $2R_i + (1-Q_i)DV$ has been performed. However, since $Q_i$ in Equation 2 is equal to either one or zero, $R_{i+2}$ is equal to either $(2R_i+DV)$ or $(2R_i-DV)$. In order to conserve time it is desirable to generate both of the quantities $2R_i+DV$ and $2R_i-DV$ and select the correct remainder based on the quotient bit of the preceding remainder in accordance with Equation 2. This requires that a serial adder and a serial subtractor, operating in parallel, be provided to generate the second remainder which is $(2R_i+DV)$ or $(2R_i-DV)$. The sign of the dividend is compared with the sign of the divisor in a first stage to determine the first quotient bit $Q_i$. It is then possible to determine from the first quotient bit whether the output of the adder or the subtractor in a second stage represents the correct remainder $R_2$. After this determination is made the sign of the selected remainder $R_2$ is then compared with the sign of the divisor to determine the second quotient bit $Q_2$ and the next correct remainder $R_3$. A third and additional stage may be provided wherein each stage includes an adder and a subtractor connected to the output of each adder and the output of each subtractor of the preceding stage, resulting in a pyramiding arrangement of adders and subtractors. Faults or incorrect remainders at the output of any adder or subtractor eliminate the possibility of correct remainders at the output of any unit pyramiding from them. The number of stages in a pyramiding arrangement may be varied as desired. Each stage provides one quotient bit for each iteration, and time may be saved by increasing the number of stages. However, since the amount of equipment in each succeeding stage is substantially increased over the equipment of the preceding stage, a practical limit as to the number of stages may be dictated by the progressively ascending costs of the additional stages. A two stage arrangement according to this invention reduces by 50% the time required to generate a quotient, and this involves a very nominal increase in equipment costs.

In a two stage arrangement according to this invention an adder-subtractor circuit is provided in the first stage, and its output is a remainder which is connected to an adder and a subtractor which constitute a second stage. The sign of the divisor and the sign of the dividend in the first stage are compared to determine the first quotient bit in the first iteration and to determine whether the second remainder is $(2R_i+DV)$ from the adder in the second stage or $(2R_i-DV)$ from the subtractor in the second stage. The hign of the selected one of the two remainders $(2R_i+DV)$ or $(2R_i-DV)$ is compared with the sign of the divisor to determine the second quotient bit and to determine whether the divisor should be added to or subtracted from the remainder from the second stage in the first stage during the second iteration. In comparing the sign bit of a divisor with the sign bit of a dividend or remainder, several simple rules state what action should be taken. If the signs are the same, the next quotient bit is a one, and the divisor is subtracted from two times the dividend or remainder to generate the next remainder. If the signs are unlike the quotient bit is a zero, and the divisor is added to two times the dividen or remainder to generate the next remainder. Serial delay line storage registers may be provided to store the remainder generated by the first iteration. The divisor may be regenerated for each iteration by subtracting the content of one storage register from the other in a two stage device. Where additional stages are employed, the difference between two selected registers always provides a quantity equal to the divisor, and this technique helps to minimize hardware by eliminating the need for an extra storage register to store the divisor, thereby minimizing costs.

Accordingly it is a feature of this invention to provide an improved serial divider arrangement.

It is a further feature of this invention to provide a serial divider which generates two or more quotient bits for each iteration.

It is another feature of this invention to provide an improved divider circuit for generating a plurality of quotient bits per iteration with a nominal increase in equipment.

It is another feature of this invention to provide an improved divider arrangement wherein the divisor is regenerated for each iteration, thereby eliminating the need for an additional register to store the divisor.

It is another feature of this invention to provide a divider arrangement having a plurality of stages each of which generates one quotient bit per iteration and operates in conjunction with the preceding stages to select the correct one of a plurality of possible remainders in the subsequent stage.

The foregoing and other objects, features, and advantages of the invention will be apparent from the following more particular description of the preferred embodiments of the invention as illustrated in the accompanying drawings.

Figure 1:
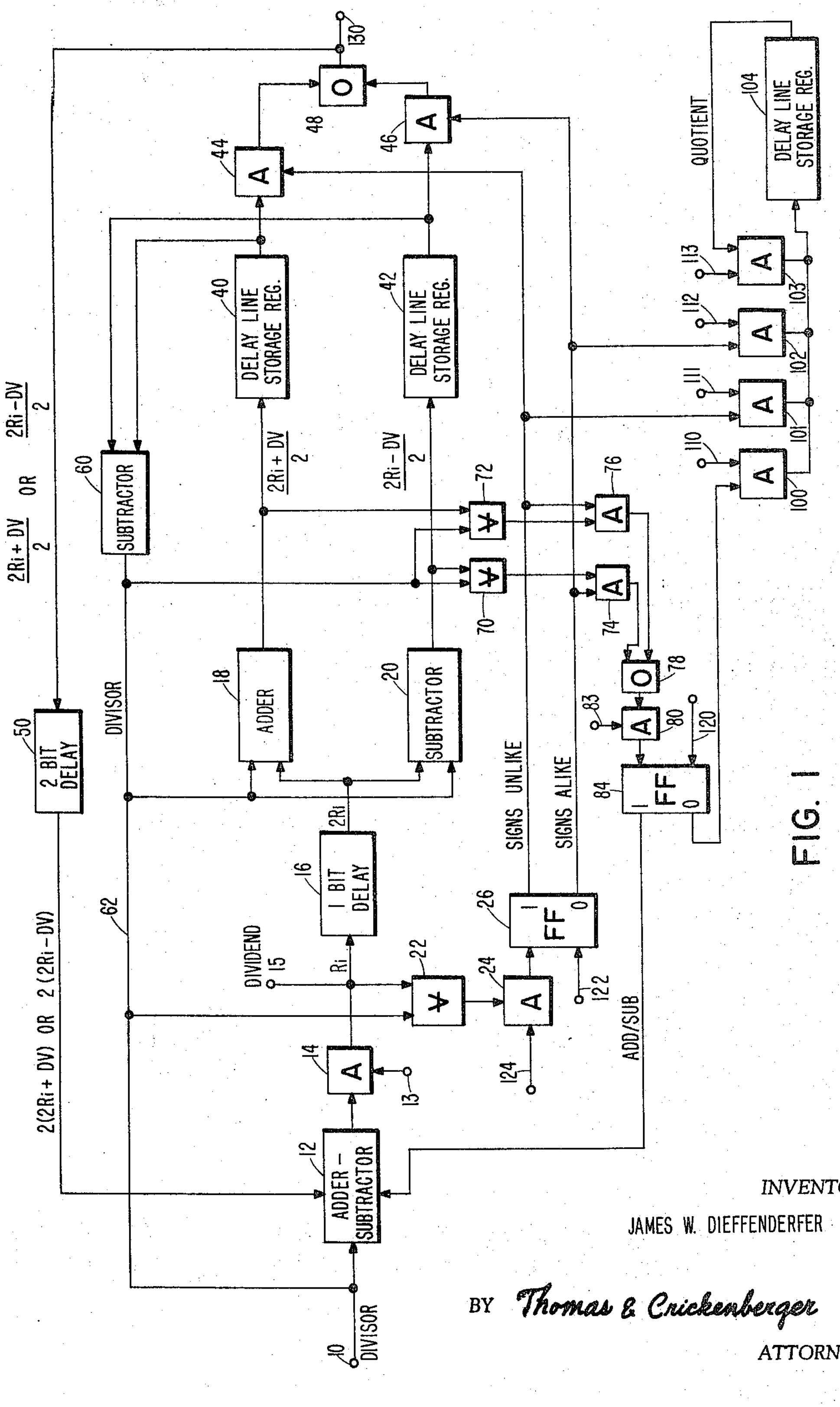
FIG. 1 illustrates one preferred arrangement of a divider circuit according to this invention.

Reference is made to FIG. 1 for a description of a preferred arrangement of a divider circuit according to this invention. A divisor is initially applied through a terminal 10 to an adder-subtractor 12. The output of the adder-subtractor 12 is supplied through an AND circuit 14 and a one bit delay circuit 16 to an adder 18 and a subtractor 20. The output of the AND circuit 14 is supplied to an exclusive OR circuit 22 the output of which in turn is supplied through an AND circuit 24 to flip-flop 26. The exclusive OR circuit 22 compares the sign of the remainder with the sign of the divisor, and the results is stored in the flip-flop 26 for control purposes. The divisor is supplied to the adder 18 and subtractor 20, and the quantity $2R_i$ is supplied to the adder 18 and subtractor 20. The output of the adder 18 represents the quantity $$\frac{2R_i+DV}{2}$$

which quantity is stored in a delay line storage register 40. The output of the subtractor 20 is $$\frac{2R_i-DV}{2}$$

which is stored in a delay line storage register 42. The output of the delay line storage register 40 is coupled to an AND circuit 44, and the output of the delay line storage register 42 is coupled to an AND circuit 46. The output of the AND circuits 44 and 46 are coupled through an OR circuit and a 2 bit delaying circuit 50 to the adder-subtractor 12. The outputs of the flip-flop 26, representing the results of the comparisons of the sign of the divisor and remainder, control the selection of the AND circuits 44 and 46. If the signs of the remainder and the divisor are unlike, the one output of the flip flop 26 energizes the AND circuit 44 to pass the content of the delay line storage register 40 to the adder-subtractor 12. If the signs of the remainder and the divisor are alike, the zero output of the flip-flop 26 conditions the AND circuit 46 to pass the content of the delay line storage register 42 through the OR circuit 48 and the two bit delay circuit 50 to the adder-subtractor 12.

The output quantity $$\frac{2R_i+DV}{2}$$

of the delay line storage register 40 is supplied to a subtractor 60, and the output quantity $$\frac{2R_i-DV}{2}$$

of the delay line storage register 42 is supplied to the subtractor 60. The difference of these quantities is the divisor, and it is supplied along a line 62 to the adder-subtractor 12, the exclusive OR circuit 22, the adder 18, the subtractor 20 and a pair of exclusive OR circuits 70 and 72. The exclusive OR circuit 70 compares the sign of the divisor with the sign of the quantity $$\frac{2R_i-DV}{2}$$

from the subtractor 20 and supplies the result to an AND circuit 74 which has a second input from the zero output side of the flip flop 26. The exclusive OR circuit 72 compares the sign of the divisor with the sign of the quantity $$\frac{2R_i+DV}{2}$$

and supplies the result to an AND circuit 76 which has a second input from the one output side of the flip-flop 26. The selected one of the AND circuits 74 and 76 supplies its resultant signal through an OR circuit 78 to an AND circuit 80. The AND circuit 80 has a second input line 83 which is energized with a timed pulse to pass result of the selected sign comparison. The output of the AND circuit 80 is supplied to the one input side of a flip-flop 84, thereby staticizing the selected result of the sign comparisons which take place in the exclusive OR circuit systems 70 and 72. The one ouput of the flip-flop 84 is connected to the adder-subtractor 12. When the flip-flop 84 is in the one state, the adder-subtractor 12 is operated as an adder, and when the flip-flop 84 is in the zero, the adder-subtractor circuit 12 is operated as a subtractor. The zero output side of the flip-flop 84 is sampled by an AND circuit 100. The AND circuits 100 through 103 are employed to insert information in delay line storage register 104 representative of the quotient. The control lines 110 through 113 are connected to respective AND circuits 100 through 103. These control lines receive timed signals during each iteration except the control line 111 to the AND circuit 101 which is energized to pass signals from the one output side of the flip-flop 26 during the first iteration only, and control line 112 of the AND circuit 102 which is not energized to condition the AND circuit 102 during the first iteration. The control line 112 is energized to condition the AND circuit 102 at selected time intervals during the second and subsequent iterations. The AND circuit 103 serves as a re-entry gate to pass the output of the delay line storage register 104 back to the input. The AND circuit 103 may be operated by signals from the control line 113 to block re-entry of information when new information is to be inserted by signals from the AND circuits 100, 101 and 102.

The zero input line 120 to the flip-flop and the zero input line 122 of the flip-flop 26 are energized to reset these flip-flops prior to making a sign comparison of the quantities involved during each iteration. The input line 124 to the AND circuit 24 is energized during the period that the sign of the divisor and the sign of the remainder are supplied to the exclusive OR circuit 22. Consequently, the result of this comparison is supplied through the AND circuit 24 to the one input side of the flip-flop 26. If the signs are unlike, the output of the exclusive OR circuit 22 is up or positive, and this level is supplied through the AND circuit 24 to the one input of the flip-flop 26, thereby changing this flip-flop from the reset or zero state to the set or one state. If the signs compared in the exclusive OR circuit 22 are alike, the output signal for the exclusive OR circuit 22 is down or negative, and the signal passed by the AND circuit 24 to the one input of the flip-flop 26 is not effective to change the state of this flip-flop. Accordingly, the flip-flop 26 continues in the zero or reset state. The result of the sign comparisons in the exclusive OR circuits 70 and 72 take place subsequent to the sign comparison which is performed in the exclusive OR circuit 22. This delay permits the flip-flop 26 to change state if necessary before selecting one of the AND circuits 74 or 76. That is, the output of the flip-flop 26 selects whether the sign comparison in the exclusive OR circuit 70 or the sign comparison in the exclusive OR circuit 72 is to be used in a given iteration, and this selection is made by the flip-flop 26 by controlling the AND circuits 74 and 76 to pass the selected signed comparison through the OR circuit 78 and the AND circuit 80 to the flip-flop 84. The timed signal applied to the control line 83 of the AND circuit 80 permits the result of the sign comparison to set the flip-flop 84 to the one state or leave it unchanged in the zero state as the case may be. The output of the flip-flop 26 is used to supply odd quotient bits to the delay line storage register 104, and the output of the flip-flop 84 is used to supply even quotient bits to the delay line storage register 104. The flip-flop 26 and the flip-flop 84 each supply one quotient bit for each iteration, thereby providing two quotient bits for each iteration.

In order to illustrate the operation of the divider circuit in FIG. 1, let it be assumed that a dividend of 0.1000 and divisor of 0.1010 are to be used in a divide operation in the circuit of FIG. 1. This yields a quotient of 0.11001 and a remainder of 0.000000110. The mathematics of such a divide operation for the circuit in FIG. 1 is illustrated in Table 1 which follows.

TABLE 1

First iteration:

Dividend $= 0.1000$

Divisor $= 0.1010$

| | | |
|---|---|---|
| $2R_1$ | $=01.000$ | $01.000$ |
| DV | $=0.1010$ | $0.1010$ |
| | $2R_1+DV=01.1010$ | $2R_1-DV=00.0110$ |

Sign of $R_1$=sign of divisor $\therefore Q_1=\bar{1}$)
and $R_2=2R_1-DV$
Sign of $R_2$=sign of divisor $\therefore Q_2=1$ Second iteration:

Regeneration of divisor $\frac{1}{2}(2R_1+DV)=0.11010$ $\frac{1}{2}(2R_1-DV)=0.00110$ $DV=0.10100$

| | | |
|---|---|---|
| $2R_2$ | $=0.110$ | |
| DV | $=0.1010$ | |
| $R_3$ | $=0.0010$ | |
| $2R_3$ | $=0.0100$ | $0.0100$ |
| DV | $=0.1010$ | $0.1010$ |
| | $2R_3+DV=00.1110$ | $2R_3-DV=11.1010$ |

Sign of $R_3$=sign of DV $\therefore Q_3=1$
and $R_4=2R_3-DV$
Sign of $R_4$=sign of DV $\therefore Q_4=0$ Third iteration:

Regeneration of divisor $\frac{1}{2}(2R_3+DV)=0.01110$ $\frac{1}{2}(2R_3-DV)=1.11010$ $DV=0.10100$

| | | |
|---|---|---|
| $2R_4$ | $=1.0100$ | |
| DV | $=0.1010$ | |
| $R_5$ | $=1.1110$ | |
| $2R_5$ | $=11.110$ | $11.110$ |
| DV | $=0.1010$ | $0.1010$ |
| | $2R_5+DV=0.0110$ | $2R_5-DV=1.0010$ |

Sign of $R_5$=sign of DV $\therefore Q_5=0$
and $R_6=2R_5+DV$
Sign of $R_6$=sign of DV $\therefore Q_6=1$
Quotient is 0.11001 and remainder of 0.000000110

The divide operation involves three iterations each of which determines two quotient bits. In the first iteration the divisor is supplied in serial form to the terminal 10 in FIG. 1, and the dividend is supplied in serial form to the terminal 15. During the first iteration a negative level is applied to the terminal 16 of the AND circuit 14, and this prevents the output of the adder-subtractor 12 from being applied to the one bit delay circuit 16 and exclusive OR circuit 22. The negative level is removed from the terminal 16 of the AND circuit 14 at the end of the first iteration, and a positive signal is applied to the terminal 16 of the AND circuit 14 for the remaining iterations.

The divisor and the dividend are supplied in serial form with the lowest order bits arriving first in time followed by succeeding higher order bits. The sign bit is last with a binary zero representing a positive number and a binary one representing a negative number. A binary one is represented by a positive pulse, and a binary zero is represented by a negative pulse or no pulse. Other levels may be used to represent binary ones and zeros. It is assumed that positive signals operate the various circuits employed. The divisor signals applied to the terminal 10 during the first iteration are supplied to the exclusive OR circuit 22, the adder 18, the subtractor 20, the exclusive OR circuit 70 and the exclusive OR circuit 72. The dividend signals are supplied through the terminal 15 during the first iteration to the one bit delay circuit 16 and the exclusive OR circuit 22. The function of the exclusive OR circuit 22 is to compare the signs of the divisor and the dividend, but this function can not be performed until the last bit of the serial train of signals of the divisor and the dividend arrive. The serial bits of the dividend representing the quantity $R_1$ are delay one bit period in the one bit delay circuit 16, and the output of this circuit represents the quantity $2R_1$. The one bit delay circuit serves the function of doubling the value of the train of signals supplied as an input thereto. The output signals representing the quantity $2R_1$ are supplied to the adder 18 and the subtractor 20. The quantity $2R_1$ is added to the divisor in the adder 18, and the divisor is subtracted from the quantity $2R_1$ in the subtractor 20. The output of the adder represents the quantity $$\frac{2R_1+DV}{2}$$

which, as illustrated in Table 1, is 01.1010. This quantity is stored in the delay line storage register 40. The output of the subtractor 20 represents the quantity $$\frac{2R_1-DV}{2}$$

which, as illustrated in Table 1, is 00.0110, and this quantity is stored in the delay line storage register 42. It is pointed out that the sum of the remainder and divisor determined by the adder and the difference of the remainder and the divisor determined by the subtractor are possible remainders which are generated during each iteration to save time. Only one of the two possible remainders will be used, the other being discarded. The two solutions are stored in the delay line storage registers 40 and 42 until the signs of the divisor and the dividend can be compared to determine which solution is the correct one. Since the sign bits of the divisor and the dividend are the last bits in the string of signals, the two solutions are stored in the delay line storage registers until after a sign comparison is made and a decision is reached as to which solution represents the proper remainder.

The sign comparison is made by the exclusive OR circuit 22 when the sign of the divisor and the sign of the dividend are supplied thereto. During the bit period when the signs are presented to the exclusive OR circuit 22, a positive level is applied to the line 124 of the AND circuit 24, and the output signal from the exclusive OR circuit 22 passes through the AND circuit 24 to the one input of the flip-flop 26. If the signs are unlike, the flip-flop 26 is set to the one state. If the signs are alike, the flip-flop 26 remains in the zero state. The flip-flop 26 is set to the zero state prior to the application of a control signal to the line 124 of the AND circuit 24. Since the sign of the dividend $R_1$ and the sign of the divisor are both plus, the signals representing these signs are down or negative, and the output signal from the exclusive OR circuit 22 is down or negative. Accordingly, the output of the AND circuit 24 is a negative signal level, and the flip-flop 26 does not undergo a change of state. It remains in the zero state and supplies a positive signal level on its zero output line to the AND circuit 46. Accordingly, the quantity $$\frac{2R-DV}{2}$$

which is stored in the delay line storage register 42 will be selected subsequently for the second iteration. The negative signal level on the one output line of the flip-flop 26 is supplied to the AND circuit 101, and the control line 111 to this AND circuit is energized with a pulse to sample the one output level of the flip flop 26 during the first iteration only. The control line 111 is energized with a pulse after the flip-flop 26 has had a chance to stabilize if it undergoes a change in state. The timing is not critical since the flip flop 26 remains unchanged until the corresponding time of the next iteration. At the time that the control line 111 is pulsed by a signal to sample the one output line of the flip flop 26, the level on the one output line of the flip flop 26 is a negative level, and a negative signal representative of a binary zero is supplied to the delay line storage register 104. This binary zero represents the quotient bit $Q_1$.

After the comparison of the signs of the divisor and the dividend takes place, the sign of the divisor is compared with the signs generated for the result emanating from the adder 18 and the result emanating from the subtractor 20. Both signs are plus as indicated by the zeros in Table 1, both of which are represented by negative signal levels. The zero output of the flip-flop 26 conditions the AND circuit 74 to pass the result of the comparison of signs in the exclusive OR circuit 70. The exclusive OR circuit 70 compares the sign of the divisor with the sign of the result from the subtractor 20. As indicated in Table 1 for the first iteration, the sign of the divisor is represented by a binary zero and the sign of the quantity $$\frac{2R_1-DV}{2}$$

is represented by a binary zero. Since both signs are alike, the output of the exclusive OR circuit 70 is a negative level, and this negative level is passed through the AND circuit 74, the OR circuit 78 and the AND circuit 80 to the one input of the flip flop 84. The flip-flop 84 is reset to the zero state by a signal applied to the zero input line 120 prior to the sign compare operation in the exclusive OR circuit 70. A positive signal level in the form of a pulse is applied to the control line 83 of the AND circuit 80 during the period that the sign compare operations take place in the exclusive OR circuit 70 and 72. The AND circuit 80 is otherwise not conditioned to pass any signals during the remaining time of a given iteration. Since the result of the comparison in the exclusive OR circuit 70 provides a negative signal level to the one input of the flip-flop 84, this flip-flop remains in the zero state to which it was previously set by a positive signal on the control line 120 immediately prior to the sign compare operation. The negative level on the one output side of the flip-flop 84 operates the adder-subtractor 12 to perform a subtract operation during the next iteration. The zero output signal of the flip-flop 84 is a positive level which is applied to the AND circuit 100, and this AND circuit is sampled by a pulse signal on the control line 110 after the flip-flop 84 has been allowed enough time to stabilize in case there was a change in state. In this instance, the AND circuit 100 response to a positive pulse on the control line 110 to supply a positive signal representing a binary one to the delay line storage register 104, and this binary one represents the quotient bit $Q_2$. It is pointed out that the signals which sample the AND circuit 100 through 103 should be appropriately spaced in time so that the signal levels representing binary ones and zeros supplied to the delay line storage register 104 are properly spaced in time to be compatible with the bit spacing of the computing device in which the circuit in FIG. 1 is employed.

After the sign compare operation in the exclusive OR circuits 70 and 72 has resulted in establishing the quotient bit $Q_2$ and conditioning the adder-subtractor 12 for the next iteration, the quantity $$\frac{2R_1-DV}{2}$$

emanates at a suitable time later from the delay line storage register 42, and this quantity is passed by the AND circuit 46, conditioned by the zero output side of the flip-flop 26, through the OR circuit 48 and the two bit delay circuit 50 to the adder-subtractor 12 to commence the second iteration. The output of the two bit delay circuit 50 is $2(2R_1-DV)$. The subtractor 60 subtracts the quantity $$\frac{2R_1-DV}{2}$$

from the quantity $$\frac{2R_1+DV}{2}$$

and provides the difference which is the divisor on the output line 62 to the adder-subtractor 12, the exclusive OR circuit 22, the adder 18, the subtractor 20, the exclusive OR circuit 70 and the exclusive OR circuit 72. The divisor is generated at the commencement of the second iteration. The divisor is subtracted from the remainder $2R_2$ shown in Table 1 in the adder-subtractor 12 in FIG. 1. At the commencement of the second iteration, the negative signal level is removed from the terminal 13 of the AND circuit 14, and a positive signal level is applied to the terminal 13, thereby conditioning the AND circuit 14 to pass signals representing the result $R_3$ from the adder-subtractor 12 to the one bit delay circuit 16 and the exclusive OR circuit 22. The sign bits of the divisor and the remainder $R_3$ are compared in the exclusive OR circuit 22 in the second iteration, and both are found to be alike. This causes the flip-flop 26 to remain in the zero state to which it was previously set. The AND circuit 112 is sampled by a pulse signal subsequently, and the positive signal level from the zero output side of the flip-flop 26 is passed to the input of the delay line storage register 104. This positive signal signifies that quotient bit $Q_3$ is a binary one. The positive level on the zero output side of the flip flop 26 selects the AND circuit 46 to pass the result from the subtractor 20 for the third iteration which takes place subsequently. The positive output level from the zero output side of the flip flop 26 conditions the AND circuit 74, thereby selecting the exclusive OR circuit 70 to determine quotient bit $Q_4$.

As soon as the divisor is subtracted from the remainder $2R_3$ in the subtractor 20 of the second iteration, the sign of the result and the sign of the divisor are supplied to the exclusive OR circuit 70, and these signs are unlike as shown in Table 1. That is, the sign of the divisor is plus as represented by a binary zero, and the sign of the remainder $R_4$ is minus as represented by a binary one in Table 1. Accordingly, the output of the exclusive OR circuit 70 is a positive level which is passed through the AND circuit 74, the OR circuit 78 to the AND circuit 80. At this instant the AND circuit 80 is conditioned by a positive level on the control line 83 to pass the positive level from the OR circuit 78 to the one input of the flip-flop 84. Since the flip-flop was previously set to the zero state by a positive signal on the control line 120, the flip flop 84 undergoes a change in state in response to the positive signal level applied to its one input side. The positive signal level on the one output side of the flip-flop 84 conditions the adder-subtractor 12 to perform an add operation in the next iteration. The negative signal level on the zero output side of the flip-flop 84 is applied to the AND circuit 100, and when this AND circuit is sampled by a positive signal level on the control line 110, it supplies a negative signal level representing a binary zero to the delay line storage register 104. This binary zero represents the quotient bit $Q_4$.

As soon as the quantity $$\frac{2R_3-DV}{2}$$

emanates from the delay line storage register 42, it is passed by the AND circuit 46 through the OR circuit 48 and the two bit delay circuit 50 to the adder-subtractor 12 to commence the third iteration. The output of the two bit delay circuit 50 is $2(2R_3-DV)$. The quantity $$\frac{2R_3-DV}{2}$$

from the delay line storage register 42 is subtracted in the subtractor 60 from the quantity $$\frac{2R_3+DV}{2}$$

from the delay line storage register 40. The output on the line 62 from the subtractor 60 represents the divisor, and it is supplied to the adder-subtractor 12, the exclusive OR circuit 22, the adder 18, the subtractor 20, the exclusive OR circuit 70 and the exclusive OR circuit 72 to commence the third iteration.

The remainder $2R_4$ and the divisor are added in the adder-subtractor 12, and the result is the remainder $R_5$ which is supplied through the AND circuit 14 to the one bit delay circuit 16 and the exclusive OR circuit 22. The output of the AND circuit 14 representing the quantity $R_5$, is compared with the sign of the divisor in the exclusive OR circuit 22. These signs are unlike as illustrated in Table 1 above for the third iteration. The flip-flop 26 is reset to the zero state by a positive pulse applied to the zero input line 122 prior to the sign compare operation. Since the signs applied to the exclusive OR circuit 22 are unlike, the output signal from the exclusive OR circuit 22 is a positive level which is applied to the AND circuit 24. A positive pulse is applied to the control line 124 of the AND circuit 24 during the sign compare operation, and the positive signal level from the exclusive OR circuit 22 is passed to the one input line of the flip-flop 26, thereby setting this flip flop to the one state. The positive signal level established on the one output line of the flip-flop 26 conditions the AND circuit 76 and the AND circuit 44. A positive pulse is applied to the control line 112 of the AND circuit 102 subsequently for the purpose of interrogating the zero output side of the flip-flop 26. However, since the zero output level of the flip-flop 26 is a negative signal level, the AND circuit 102 supplies a negative signal level to the delay line storage register 104 representing a binary zero. This binary zero signifies that the quotient bit $Q_5$ is a zero.

The sign of the result from the adder 18, representing the quantity $2R_5+DV$, is compared with the sign of the divisor in the exclusive OR circuit 72. Since the signs are alike as indicated in Table 1 above, the output signal from the exclusive OR circuit 72 is a negative level which is supplied through the AND circuit 76, the OR circuit 78 and the AND circuit 80 to the one input side of the flip-flop 84. It is pointed out that the positive pulse applied on the control line 83 to the AND circuit 80 during the sign compare operation is ineffective to change the propagation of the negative signal level from the output of the exclusive OR circuit 72 to the one input side of the flip-flop 84. Accordingly, the flip-flop 84 remains in the zero state to which it was reset prior to this sign compare operation. Accordingly, the positive signal level on the zero output side is applied to the AND circuit 100, and when the control line 110 is energized with a positive pulse, a positive pulse is supplied to the delay line storage register 104 representative of a binary one. This binary one signifies that quotient bit $Q_6$ is a one. Subsequently, the remainder $R_6$ emanates from the delay line storage register 40, and it passes through the AND circuit 44 and the OR circuit 48 to the terminal 130. The remainder $R_6$ represents the true remainder, and it may be supplied to a load device, not shown, via the terminal 130. The remainder $R_6$ represents the true remainder except for a binary point correction. The quotient stands in the delay line storage register 104, and it may be recirculated therein by continuously conditioning the control line 113 of the AND circuit 103 with a positive signal level. The quotient for the division problem illustrated in Table 1 is 0.11001 and the remainder is 0.000000110. Thus it has been demonstrated how the novel divider circuit in FIG. 1 utilizes a nominal amount of equipment to generate two quotient bits per iteration, thereby reducing by 50% the time normally required to perform a division operation.

Figure 2:
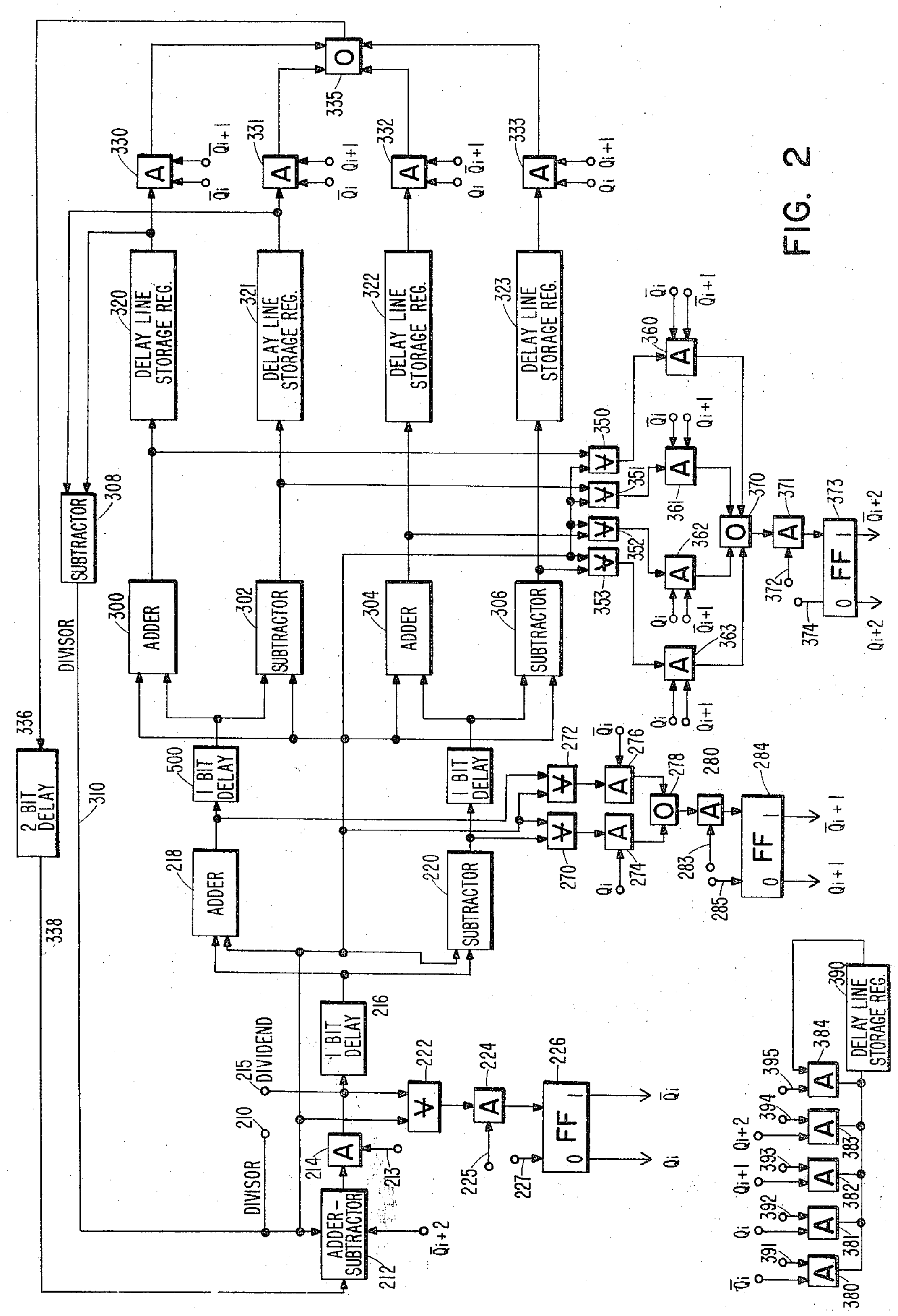
FIG. 2 illustrates a pyramid arrangement according to this invention which generates three quotient bits per iteration.

Reference is made to FIG. 2 for illustration of a pyramid arrangement of adder and subtractor circuits in a divider which determines three quotient bits per iteration. The adder-subtractor 212 is connected through an AND circuit 214 to a one bit delay circuit 216 and an exclusive OR circuit 222. The AND circuit 214 has a control line 216 which is energized during the first iteration to prevent the output of the adder-subtractor 212 from being passed to the one bit delay circuit 216 and the exclusive OR circuit 222. For each subsequent iteration, other than the first one, the line 216 is energized with a level which conditions the AND circuit 214 to pass the output of the adder-subtractor 212 to the one-bit delay circuit 216 and the exclusive OR circuit 222. The output of the one bit delay circuit 216 is conveyed to the adder 218 and the subtractor 220.

The sign of the divisor and the sign of the dividend are compared in the exclusive OR circuit 222, and the result is supplied to an AND circuit 224 the output of which is connected to the one input side of a flip-flop 226. The AND circuit 224 has a control line 225 which is energized with a pulse which conditions the AND circuit 224 at the time the sign of the divisor and the sign of the dividend are presented to the exclusive OR circuit 222, and the control line 225 is energized with a signal which deconditions the AND circuit 224 at all other times during an iteration. The one output side of the flip flop 226 represents the quantity $\overline{Q}_i$ and the zero output side of the flip flop 226 represents the quantity $Q_i$.

The output of the adder 218 is connected to the exclusive OR circuit 272 where it is compared with the divisor. The output of the subtractor 220 is connected to the exclusive OR circuit 270 where it is compared with the divisor. The output of the exclusive OR circuit 270 is passed by the AND circuit 274 and the output of the exclusive OR circuit 272 is passed by the AND circuit 276. Only one of these AND circuits is selected at a given time. The one selected depends on the state of the flip flop 226. The outputs of the AND circuits 274 and 276 are connected through an OR circuit 278 and an AND circuit 280 to the one input side of a flip flop 284. The AND circuit 280 is conditioned once during each iteration to pass signals from the OR circuit 278 by a pulse signal on a control line 283. The pulse signal on the control line 283 is presented during the time that the sign of the divisor and the sign of the remainder are presented to the exclusive OR circuits 270 and 272. The flip-flop 284 is reset to the zero state by a signal on the zero input line 285 prior to the application of the pulse signal on the control line 283 of the AND circuit 280. The one output side of the flip-flop 284 represents the quantity $\overline{Q}_i+1$, and the zero output of the flip-flop 284 represents the $Q_i+1$.

The output of the adder 218 in FIG. 2 is supplied to a one bit delay circuit 500. The output of circuit 500 is supplied to an adder 300 and a subtractor 302. The output of the subtractor 220 is connected to a one bit delay circuit 501. The output of circuit 501 is supplied to an adder 304 and a subtractor 306. The outputs of the adder 300 and the subtractor 302 are connected to respective delay line storage registers 320 and 321. The outputs of the adder 304 and the subtractor 306 are connected to respective delay line storage registers 322 and 323. The output of the delay line storage registers 320 through 323 are connected through respective AND circuits 330 through 333 to an OR circuit 335, the output of which is connected to a two-bit delay circuit 336. The output of the two-bit delay circuit 336 is supplied on line 338 to the adder-subtractor 212. The quantity represented by signals on the line 338 is the new remainder. The outputs of the delay line storage registers 320 and 321 are supplied to a subtractor 308. The output of the subtractor 308, representative of the divisor, is supplied to the adder-subtractor 212 for the next iteration.

The output of the adder 300, the output of the subtractor 302, the output of the adder 304 and the output of the subtractor 306 are compared with the divisor in respective exclusive OR circuits 350 through 353. The output of the exclusive OR circuits 350 through 353 are connected to respective AND circuits 360 through 363 the outputs of which in turn are connected to an OR circuit 370. The output of the OR circuit 370 is connected through an AND circuit 371 to the one input side of a flip-flop 373. The control line 372 of the AND circuit 371 is pulsed with a signal which conditions this AND circuit during the period when the sign of the divisor and the sign of the selected remainder are applied to the exclusive OR circuits 350 through 353. The flip-flop 373 is reset to the zero state by a pulse signal on the zero input line 374 prior to the application of a pulse signal to the control line 372. The zero output line of the flip flop 373 represents the quantity $Q_{i+2}$, and the one output line of the flip flop 373 represents $\overline{Q}_{i+2}$.

The one and zero outputs of the flip-flops 226, 284 and 373 are applied to the various inputs of the AND circuits 330 through 333 to select one of these AND circuits during each iteration. The legends on the outputs of these flip-flops and the various AND circuits indicate the manner of the connections. The outputs of the flip-flop 226 are connected to the AND circuits 274 and 276 to select one of these AND circuits during each iteration. The outputs of the flip-flops 226 and 284 are applied to the AND circuits 360 through 363 to select one of these AND circuits during each iteration. The outputs of the flip-flops 226, 284 and 373 are connected to respective AND circuits 380 through 383. The AND circuits 380 through 383 supply quotient bits to a delay line storage register 390. The AND circuit 384 is employed to recirculate the content of the delay line storage register 390. The AND circuits 380 through 384 are sampled by timed signals on respective control lines 391 through 395. These AND circuits are sampled by timed signals in order to insure that the information supplied to the delay line storage register 390 is properly spaced. The AND circuit 380 is sampled during the first iteration only to determine quotient bit $Q_1$ and the AND circuit 381 is sampled in the second and each subsequent iteration to determine a quotient bit in response to the flip-flop 226. The AND circuits 382 and 383 respond to associated flip-flops 284 and 373 to determine one quotient bit each during every iteration.

The circuit in FIG. 2 represents a pyramid arrangement of adder and subtractor circuits for generating three quotient bits per iteration. In order to illustrate the operation of the divider in FIG. 2, let it be assumed that a divisor is applied in serial form to a terminal 210 simultaneously as a dividend is supplied in serial form to the terminal 215. A signal is supplied on the control line 213 of the AND circuit 214 which blocks the output of the adder-subtractor 212 for the first iteration. The dividend is delayed one bit period in the one-bit delay circuit 216 and applied to the adder 218 and the subtractor 220. The divisor is also applied to the adder 218 and the subtractor 220. The output of the one-bit delay circuit 500 is supplied along with the divisor to the adder 300 and the subtractor 302 the outputs of which are supplied to respective delay line storage registers 320 and 321. The output of the one-bit delay circuit 501 is supplied along with the divisor to the adder 304 and the subtractor 306 the outputs of which are supplied to respective delay line storage registers 322 and 323. The various add-and-subtract operations take place with signals which are supplied in serial form. The sign of the divisor and the sign of the dividend are represented by bits disposed at the end of the serial train of signals. This is, the sign bit positions occur last in time. When the sign of the divisor and the sign of the dividend are presented to the exclusive OR circuit 222, a comparison is made. If the signs are unlike, the output of the exclusive OR circuit 222 is a positive signal level which is passed by the AND circuit 224 by a conditioning signal applied to the control line 225 during the period when the signs are presented. The output of the AND circuit 224 is a positive signal level which sets the flip-flop 226 to the one state. If the signs compared in the exclusive OR circuit 222 are alike, the output signal level of the exclusive OR circuit 222 is a negative signal level which is passed by the AND circuit 224 to the one input of the flip-flop 226. The negative signal level applied to the one input of the flip-flop 226 is ineffective to change its state, and the flip-flop 226 remains in the zero state to which it was set previously by a signal on the zero input line 227. The outputs of the flip-flop 226 are supplied to the AND circuits 380 and 381 to provide a quotient bit. During the first iteration the quotient bit is determined by the condition of the AND circuit 380, and the AND circuit 381 responds to information from the flip-flop 226 to determine quotient bits for the second and subsequent iterations. Also, the outputs of the flip-flop 226 are used to select either the AND circuit 274 or the AND circuit 276 as part of the operation of determining the next quotient bit.

As soon as the sign of the divisor and the sign of the remainder from the subtractor 220 and the adder 218 are supplied to respective exclusive OR circuits 270 and 272, a comparison is made and the result is stored in the flip-flop 284 in the manner previously explained. The outputs of the flip-flop 284 are supplied to the AND circuits 360 through 363 to aid in determining the next quotient bit. Also, the signal level from the zero output side of the flip-flop 284 is conveyed through the AND circuit 382 as a quotient bit to the delay line storage register 390.

As soon as the sign of the remainders from the adder 300, the subtractor 302, the adder 304 and the subtractor 306 become available, they are compared with the sign of the divisor in respective exclusive OR circuits 350 through 353. The output of one of the exclusive OR circuits 350 through 353 is passed by a selected one of the AND circuits 360 through 363, and the result is stored in the flip-flop 373. The particular one of the AND circuits 360 through 363 which is selected is determined by the state of the flip-flops 226 and 284. The signal level from the zero output of the flip-flop 373 is supplied through the AND circuit 383 as a quotient bit to the delay line storage register 390. The one output side of the flip-flop is supplied to the adder-subtractor 212 to control whether an add or subtract operation is performed during the next iteration. The content of one of the delay line storage registers 320 through 323 is passed by a selected one of the associated AND circuits 330 through 333 to the OR circuit 335, and this serial train of signals is passed by a two-bit delay circuit 236 to the adder-subtractor 212 as the new remainder for the commencement of the next iteration. Accordingly, it is seen that three quotient bits are determined by the first iteration in the divider circuit of FIG. 2. In like fashion three quotient bits are determined for the second and each subsequent iteration.

Figure 3:
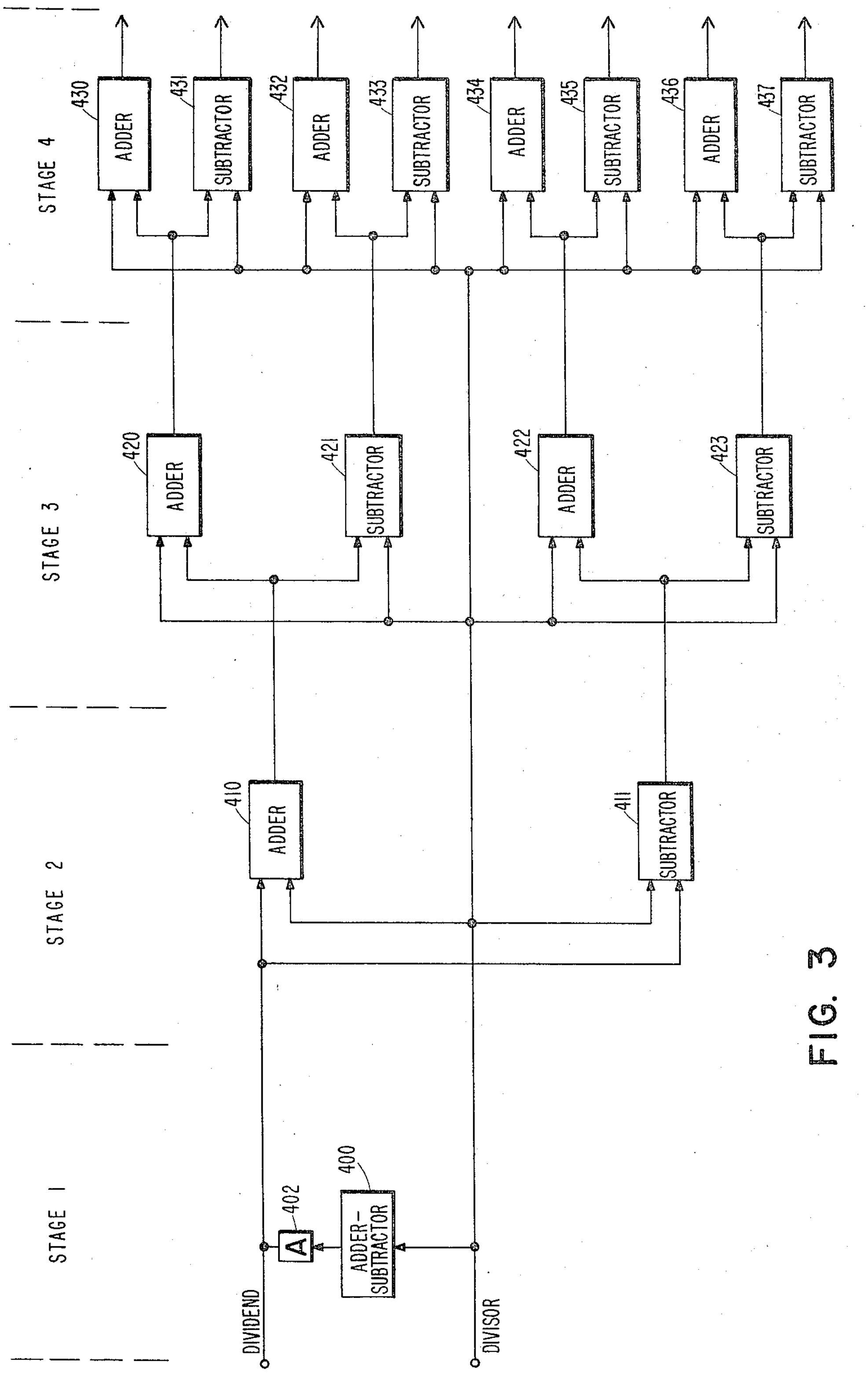
FIG. 3 illustrates a pyramid arrangement of adder and subtractor circuits, with the control circuits omitted, for generating four quotients bits per iteration.

Reference is made to FIG. 3 which illustrates a pyramid arrangement of adders and subtractors for determining four quotient digits per iteration. Control and delay circuitry is omitted in the interest of simplicity. Four stages are illustrated with adder and subtractor circuits. It is noted that the number of adder and subtractor circuits increases by a geometric progression as the number of stages is increased. That is, stage 1 includes one adder-subtractor 400 which generates one remainder, and stage 2 includes an adder 410 and a subtractor 411, the outputs of which generates two possible remainders. Stage 3 includes an adder 420, a subtractor 421, an adder 422 and a subtractor 423 for generating four possible remainders, and stage 4 includes adders or subtractor units 430 through 437 which generate eight possible remainders. The selected remainder from stage 4 is supplied to the adder-subtractor 400 of stage 1 at the end of each iteration for the purpose of commencing the next iteration. It is pointed out that a fifth stage, if provided, would generate 16 possible remainders, and if a sixth stage were provided it would generate 32 possible remainders. As many quotient bits may be generated for each iteration as there are stages provided in a divider circuit according to this invention. However, some point is reached in practice where the additional time saved by increasing the number of stages is counter-balanced by the increased amount of equipment required for the additional stages.

While the invention has been particularly shown and described with reference to preferred embodiments thereof, it will be understood by those skilled in the art that various changes in form and details may be made therein without departing from the spirit and scope of the invention.

What is claimed is:

1. A divider circuit including a plurality of N stages each of which generates one quotient bit for each iteration in a division operation, where N is any integer greater than 1, the first stage including an adder-subtractor circuit for developing signals representing a remainder, the second stage including an adder for developing a first possible remainder and a subtractor for developing signals representing a second possible remainder, a delay circuit connected between the adder-subtractor of the first stage and the adder and the subtractor in the second stage for supplying delayed signals representing the remainder from the first stage to the adder and the subtractor of the second stage, the third and succeeding stages including an adder and a subtractor coupled through a delay circuit to each adder of the preceding stage, the third and succeeding stages including an adder and a subtractor coupled through a delay circuit to each subtractor of the preceding stage, whereby each stage generates signals representing twice as many possible remainders as the preceding stage, first means having an output coupled to the adder-subtractor of the first stage, the adder and subtractor of the second stage and the adders and subtractors of the third and subsequent stages for supplying signal thereto representing the divisor, the signals representing the divisor and each possible remainder including signals representing a sign of the quantity, second means in each stage which develops a quotient bit by comparing the signal representing the sign of the divisor with each signal representing the signs of each possible remainder, said second means providing a quotient bit of 1 when the signs are alike and a quotient bit of 0 when the signs are unlike, said second means including further means coupled to the adder and subtractor devices of each succeeding stage for selecting a particular adder or subtractor which develops the correct remainder for that stage, whereby N quotient bits are generated for each iteration of the division operation, and means for initially supplying signals representing the dividend to the junctive of the delay circuit and the adder-subtractor of the first stage.

2. The apparatus of claim 1 including storage means connected to the adders and subtractors of the last stage for storing all of the possible remainders, and means for selectively supplying the correct remainder from said storage means to the adder-subtractor of the first stage for the commencement of the next iteration.

3. The apparatus of claim 2 wherein said first means is a subtractor having two inputs and an output, the inputs coupled to said storage means for receiving a pair of the possible remainders developed in the last stage, the output of said subtractor being the output of said first means.

4. A divider arrangement including at least two stages each of which generates a quotient bit during each iteration in a division operation, the first stage including an adder-subtractor having two inputs and an output, the second stage including an adder having two inputs and one output and a subtractor having two inputs and one output, a delay circuit having an input and an output, the output of the adder-subtractor of the first stage being connected to the input of said delay circuit, the output of said delay circuit being connected to one of the inputs of the adder in the second stage and one input of the subtractor of the second stage, a first storage register having an input and an output, a second storage register having an input and an output, the output of the adder in the second stage being connected to the input of the first storage register, the output of the subtractor in the second stage being connected to the input of the second storage register, first means coupled between the outputs of said first and second storage registers and one of the inputs of said adder-subtractor of the first stage, second means having two inputs and an output, the output of the adder-subtractor of the first stage being connected to one of the inputs of said second means, the output of said second means providing signals representative of one quotient bit, the output of said second means being connected to said first means for operating the first means to selectively supply the content of either said first storage register or said second storage register to one of the inputs of said adder-subtractor of the first stage, third means having first, second, third and fourth inputs and an output, the output of the adder in the second stage being connected to the first input of the said third means, the output of the subtractor in the second stage being connected to the second input of said third means, the output of the second means being connected to the third input of said third means, the output of said third means providing a signal representative of a quotient bit, said adder-subtractor of the first stage having a control input which operates the adder-subtractor to add or subtract, the output of said third means being connected to the control input of the adder-subtractor of the first stage, fourth means having an output for supplying signals representative of the divisor to one of the inputs of the adder-subtractor of the first stage, one of the inputs of the adder in the second stage, one of the inputs of the subtractor in the second stage, one of the inputs to said second means and the fourth input of said third means, and fifth means responsive to the outputs of the second means and the third means for storing signals representative of the bits of a quotient.

5. The apparatus of claim 4 wherein the fourth means includes a subtractor having two inputs and one output, the output of the first storage register being connected to one of the inputs of the subtractor in the fourth means, the output of the second storage register being connected to the other input of the subtractor in said fourth means, the output of the subtractor being connected to the output of said fourth means, whereby the output of said subtractor in the fourth means provides signals representative of the divisor during each iteration of a division operation.

6. A divider arrangement including at least two stages each of which generates a quotient bit during each iteration in a division operation, the first stage including an adder-subtractor having two inputs and an output, the second stage including an adder having two inputs and one output and a subtractor having two inputs and one output, the output of the adder-subtractor of the first stage being connected to one of the inputs of the adder in the second stage and one input of the subtractor of the second stage, first means having two inputs and an output, the output of the adder-subtractor of the first stage being connected to one of the inputs of said first means, the output of said first means providing signals representative of one quotient bit, a second means having first, second, third and fourth inputs and an output, the output of the adder in the second stage being connected to the first input of the said second means, the output of the subtractor in the second stage being connected to the second input of said second means, the output of the first means being connected to the third input of said second means, the output of said second means providing a signal representative of a quotient bit, said adder-subtractor of the first stage having a control input which operates the adder-subtractor to add or subtract, the output of said second means being connected to the control input of the adder-subtractor of the first stage, third means having an output for supplying signals representative of the divisor to one of the inputs of the adder-subtractor of the first stage, one of the inputs of the adder in the second stage, one of the inputs to said first means and the fourth input of said second means, and fourth means responsive to the outputs of the first means and the second means for storing signals representative of the bits of a quotient.

7. The apparatus of claim 6 including storage means connected to the adders and subtractors of the last stage for storing all of the possible remainders, and means for selectively supplying the correct remainder from said storage means to one of the inputs of the adder-subtractor of the first stage for the commencement of the next iteration in the division process.

8. The apparatus of claim 7 wherein said third means is a subtractor having two inputs and an output, the inputs being coupled to said storage means for receiving a pair of the possible remainders developed in the last stage, the output of said subtractor being the output of said third means.

9. A divider arrangement having N stages connected in tandem each of which generates one quotient bit for each iteration in a divide operation, where N is any integer greater than 1, the first stage including an adder-subtractor, the second stage including an adder and a subtractor, the adder-subtractor of the first stage being connected to the adder and the subtractor in the second stage, the third and succeeding stages including an adder and a subtractor coupled to each adder of the preceding stage, the third and succeeding stages including an adder and a subtractor coupled to each subtractor of the preceding stage, whereby each stage generates signals representing twice as many possible remainders as the preceding stage, first means for supplying signals representing a divisor to the adder-subtractor of the first stage and the adders and the subtractors in all succeeding stages, the signals representing the divisor and the signals representing each possible remainder including signals representing a sign of the quantity, each stage including a second means for comparing the sign of the divisor with the sign of each possible remainder, third means in each stage responsive to said second means for selecting one of the possible remainders as the correct remainder for that stage, the third means in each stage having an output signal representing a quotient bit, the output signal of the third means in each stage being connected to the third means in each succeeding stage for selecting the correct remainder from among the various possible remainders, and means responsive to the output signals of said third means in each stage for storing signals representing a quotient.

10. The apparatus of claim 9 including storage means connected to the adders and subtractors of the last stage for storing all of the possible remainders, and means for selectively supplying the correct remainder from said storage means to one of the inputs of the adder-subtractor of the first stage for commencement of the next iteration in the division process.

11. The apparatus of claim 10 wherein said first means is a subtractor having two inputs and an output, the inputs being coupled to said storage means for receiving a pair of the possible remainders developed in the last stage, the output of said subtractor being the output of said first means.

References Cited by the Examiner

Saltman: "Reducing Computing Time for Synchronous Binary Division," IRE Transaction on Electronic "Computers, vol. EC-10, 1961, pages 169 to 174.

MALCOLM A. MORRISON, *Primary Examiner.*

M. P. HARTMAN, *Assistant Examiner.*